April 5, 1949.  G. G. HAMILTON  2,466,543
FABRICATED BEARING OR PILLOW BLOCK FOR SHAFTS
Filed July 30, 1946
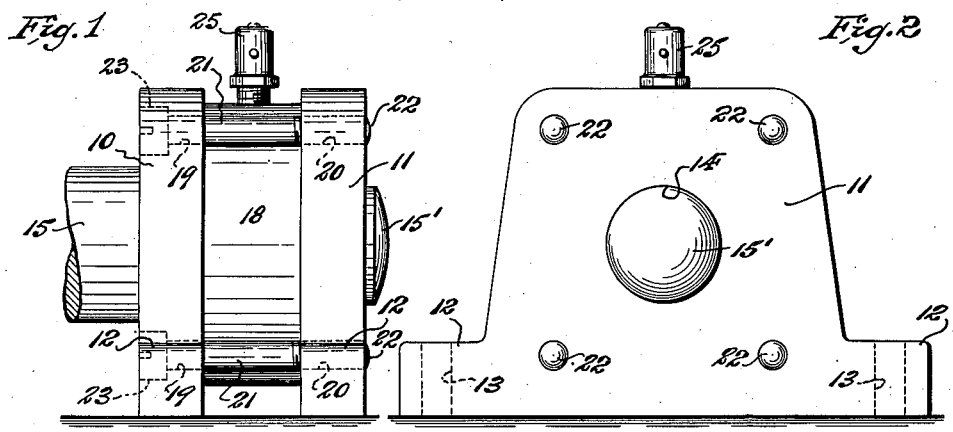
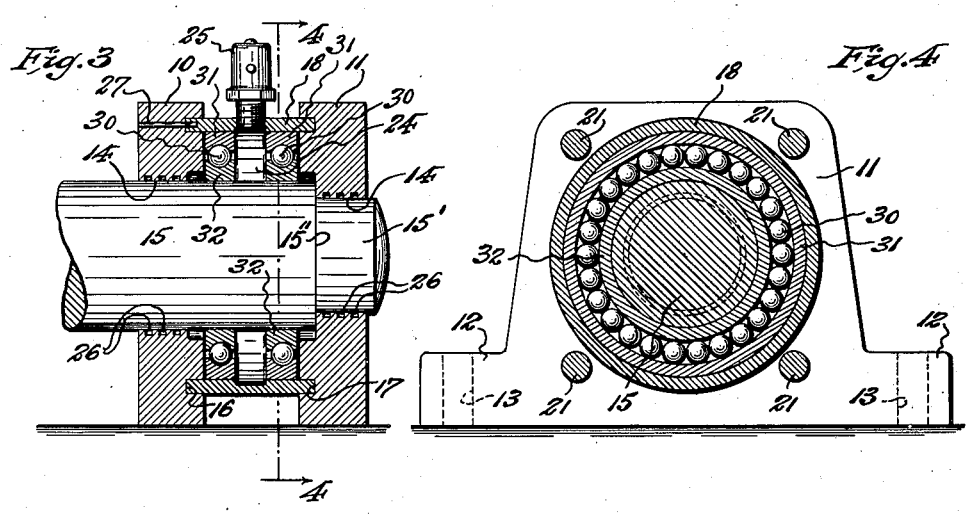
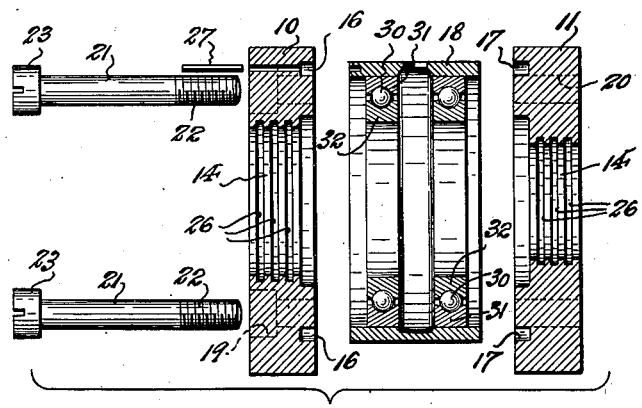
INVENTOR.
George G. Hamilton,
BY
George D. Richards,
Attorney Patented Apr. 5, 1949

2,466,543

UNITED STATES PATENT OFFICE 2,466,543

FABRICATED BEARING OR PILLOW BLOCK FOR SHAFTS

George G. Hamilton, Maplewood, N. J.

Application July 30, 1946, Serial No. 687,104

4 Claims. (Cl. 308—187)

This invention relates to improvements in shaft bearings, pillow blocks or the like.

The invention has for an object to provide a novel construction of fabricated bearing or pillow block for shafts of given diametric size which is of very simple and economical structure, and which comprises an assembly of elements certain of which are exchangeable whereby to permit variation of the length of the bearing or pillow block, as may, in any given case be desired.

The invention has for another object to provide a novel construction of fabricated bearing or pillow block for shafts which is compact in form so as to occupy but a minimum of room when in place, and which can be easily sized to accommodate the same for occupation of cramped or limited space, and which is relatively light in weight.

A further object of the invention is to provide a novel fabricated shaft bearing or pillow block comprising a pair of end members and an intermediate tubular spacing element or sleeve which is adapted to be interlockingly engaged between said end members, whereby to space the latter so as to provide a bearing of desired length said spacing element or sleeve being adapted to provide housing for bearing means, such e. g. as an anti-friction bearing member or members; means being further provided for strongly uniting and securing said end members and sleeve together in operative assembled relation.

Other objects of this invention, not at this time more particularly enumerated, will be understood from the following detailed description of the same.

An illustrative embodiment of this invention is shown in the accompanying drawings, in which:

Fig. 1 is a side elevational view of the shaft bearing or pillow block made according to this invention; Fig. 2 is an end elevational view of the same, viewed from the right in Fig. 1; Fig. 3 is a longitudinal sectional view of the bearing or pillow block; and Fig. 4 is a transverse sectional view of the same, taken on line 4—4 in Fig. 3.

Fig. 5 is a longitudinal sectional view of the bearing or pillow block with the parts thereof disassembled.

Similar characters of reference are employed in the above described views, to indicate corresponding parts.

Referring to the drawings, the bearing or pillow block according to this invention comprises a pair of transverse upstanding end members, which for convenience of identification are herein denominated a forward end member 10 and a rearward end member 11.

Each said end member may be made of suitable cast or machined metal, ordinarily a ferrous metal, and is suitably dimensioned in height and width according to the diameter of shaft desired to be served by the bearing or pillow block, and is of substantial thickness, being provided with a suitably sized passage 14 for the extension therethrough of the shaft 15 served by the bearing or pillow block. At the bottom end, each said end member is provided with laterally projecting foot pieces 12, respectively projecting from its opposite sides. Said foot pieces are drilled to provide vertical passages 13 for the reception of hold down bolts (not shown), whereby the bearing or pillow block may be fixed in place of use.

Provided in the inner or rearward face portion of the bearing member 10 is an annular channel or seating groove 16 which is disposed concentric to the axis of the shaft passage 14 of said member. Said channel or seating groove 16 is of substantially greater diameter than that of said passage 14. In like manner, provided in the inner or forward face portion of the bearing member 11 is a correspondingly sized and located annular channel or seating groove 17.

The said bearing members are longitudinally spaced apart, with their shaft passages 14 in axial alignment, by a tubular spacing element or sleeve 18, the respective end portions of which are entered in the respective channels or seating grooves 16 and 17 of the opposed bearing end members 10 and 11, thus interlockingly engaging the same with and between end members. Said tubular spacing element or sleeve 18 may be selectively varied in length according to the total length of shaft bearing or pillow block desired to be provided.

The interior of said tubular spacing element or sleeve 18 provides a housing for shaft bearing means of any suitable character. Preferably said shaft bearing means is of an anti-friction type. For example, as shown, said shaft bearing means comprises one or more ball-bearing sets 30, the outer race or races 31 of which being fixed by a press fit to the interior surface of said spacing element or sleeve 18, while the inner race or races 32 of which being fixed by a press fit to the exterior surface of the shaft 15.

The forward end member 10 is provided with a plurality of tie-bolt passages 19 extending through the thickness thereof, and preferably counterbored at their outer ends; said passages being circumferentially spaced apart in radially outward offset relation to the channel or seating groove 16 of said forward end member. Similarly, the rearward end member 11 is also provided with a plurality of internally screw-threaded tie-bolt receiving openings 20, which are correspondingly circumferentially spaced apart in radially outward offset relation to the channel or seating groove 17 of said rearward end member.

After the end members 10 and 11 and the intermediate tubular spacing element or sleeve 18 and anti-friction bearings have been assembled in the manner and relation above stated, tie-bolts 21 are passed through aligned passages 19 and into openings 20 of said end members, so that the screw-threaded ends 22 of said tie-bolts are screwed into said openings 20 until the heads 23 of said tie-bolts are entered in the counterbored portions of said passages 19. Said tie bolts 21 pass from end member to end member exteriorly of the tubular spacing element or sleeve 18, and, when tightened home, serve to very securely bind said end members and element or sleeve 18 in operative assembled relation, so as to thereby form the unitary shaft bearing or pillow block structure.

It will be understood from an inspection of the drawings that the shaft 15 bridges between the spaced forward and rearward end members 10 and 11, with the intermediate portion of said shaft journaled in the ball-bearing sets 30. If desired, space within the element or sleeve 18 adjacent the ball-bearing sets may be utilized to provide a chamber 24, which is adapted to serve as a lubricant packing or holding space, which may be charged with a suitable lubricating substance, such e. g. as a grease. To admt the lubricant into said chamber 24, the tubular element or sleeve 18 may be provided with any suitable form of valved lubricant admission device 25, which is adapted to be secured thereto in exterior projection therefrom, but in communication with said chamber 24.

If desired, the surfaces of the shaft passages 14 of said end members 10 and 11 may be provided with a plurality of axially spaced annular sealing grooves or channels 26, whereby to seal lubricant relative to the shaft 15, and in this connection any suitable form of sealing means or ring (not shown) may be associated therewith.

The tubular element or sleeve 18 may be fixed against rotative shift or displacement relative to the end members 10 and 11 with which it is assembled; this being especially desirable when said element or sleeve is provided with a lubricant admission device 25, so that the location of the latter may be fixed. To so secure said tubular element or sleeve 18, a dowel pin 27 is passed through one of the end members, as e. g. the forward end member 10, and into the body of the adjacent end portion of said tubular element or sleeve. Although not shown, a similar dowel pin may alaso be passed through the end member 11 and into the adjoining end portion of said tubular element or sleeve 18, if so desired.

If desired, the shaft passage 14 of the rearward end member 11 may be of reduced diameter to receive a reduced end portion 15' of the shaft 15. The juncture of the main body of the shaft 15 and its reduced end portion 15' provides a shoulder 15" which is opposed to the inner face portion of the end member 11.

The novel shaft bearing or pillow block according to my invention is for comparable bulk of considerably less weight than the ordinary cast bearing or pillow block. By reason of its light weight, but nevertheless efficient bearing support, the bearing or pillow block of this invention is especially well adapted for use in places where minimum weight is to be considered, such e. g. as in aeroplane construction. Furthermore, since the tubular spacing element or sleeve 18 may be provided of any selected length, it is very easy to fabricate the bearing or pillow block of any desired overall length.

Having now described my invention, I claim:

1. A fabricated pillow block formed by three main parts comprising longitudinally spaced and opposed transverse upstanding end members having aligned passages for the extension of a shaft therethrough, and a tubular spacing element of selected length extending between said end members; said tubular element being adapted to support anti-friction shaft bearing means intermediate said end members; said end members having annular seating grooves in their inner faces concentric to the axes of said shaft passages thereof, the ends of said tubular spacing element being mortised in said grooves, means to secure the assembled end members and tubular spacing element together so as to form thereby a unitary pillow block structure, and said end members having laterally projecting perforate foot pieces engageable by means to fix the pillow block structure in place of use.

2. A fabricated pillow block formed by three main parts comprising longitudinally spaced and opposed transverse upstanding end members having aligned passages for the extension of a shaft therethrough, and a tubular spacing element of selected length extending between said end members; anti-friction shaft bearing means supported by and within said tubular spacing element intermediate said end members; said end members having annular seating grooves in their inner faces concentric to the axis of the shaft passages of said end members, the ends of said tubular spacing element being mortised in said grooves, a plurality of tie-bolts engaged with and extending between said end members exteriorly of said tubular spacing element whereby to secure the assembled end members and tubular spacing element together so as to form thereby a unitary pillow block structure, and said end members having laterally projecting perforate foot pieces engageable by means to fix the pillow block structure in place of use.

3. A fabricated pillow block as defined in claim 2 wherein said tubular spacing element defines an annular chamber around the shaft, and means for introducing lubricating substance into said chamber.

4. A fabricated pillow block formed by three main parts comprising longitudinally spaced and opposed transverse upstanding end members having aligned passages for the extension of a shaft therethrough sized to correspond to the diameter of the shaft, and a tubular spacing element of selected length extending between said end members; a pair of longitudinally spaced anti-friction shaft bearing means supported by and within said tubular spacing element intermediate said end members; said end members having annular seating grooves in their inner faces concentric to the axis of the shaft passages of said end members, the ends of said tubular spacing element being mortised in said grooves, a plurality of tie-bolts engaged with and extending between said end members exteriorly of said tubular spacing element whereby to secure the assembled end members and tubular spacing element together so as to form thereby a unitary pillow block structure, said end members having laterally projecting perforate foot pieces engageable by means to fix the pillow block structure in place of use; said tubular spacing element being adapted to define an annular chamber around the shaft and intermediate the spaced shaft bearing means, means for introducing lubricating substance into said chamber; and the walls of the shaft passages of said end members being provided with axially spaced annular sealing means.

GEORGE G. HAMILTON.

REFERENCES CITED

The following references are of record in the file of this patent:

UNITED STATES PATENTS

| Number | Name | Date |
|---|---|---|
| 1,699,330 | Gayman | Jan. 15, 1922 |

FOREIGN PATENTS

| Number | Country | Date |
|---|---|---|
| 52,971 | Sweden | Apr. 30, 1919 |
| 491,613 | France | June 10, 1919 |